United States Patent
Goodwin et al.

[19]

[11] Patent Number: 6,158,049
[45] Date of Patent: Dec. 5, 2000

[54] USER TRANSPARENT MECHANISM FOR PROFILE FEEDBACK OPTIMIZATION

[75] Inventors: David W. Goodwin, Waltham, Mass.; Robert S. Cohn, Salem, N.H.; Paul G. Lowney, Concord; Norman Rubin, Cambridge, both of Mass.

[73] Assignee: Compaq Computer Corporation

[21] Appl. No.: 09/132,449

[22] Filed: Aug. 11, 1998

[51] Int. Cl.$^7$ ...................................................... G06F 9/45
[52] U.S. Cl. ........................................ 717/9; 717/4; 717/5
[58] Field of Search .................................................... 717/9

[56] References Cited

U.S. PATENT DOCUMENTS

| | | | |
|---|---|---|---|
| 5,579,520 | 11/1996 | Bennett ........................................ | 717/4 |
| 5,613,118 | 3/1997 | Heisch et al. ............................... | 717/9 |
| 5,655,122 | 8/1997 | Wu ............................................... | 717/5 |
| 5,659,752 | 8/1997 | Heisch et al. ............................... | 717/9 |
| 5,815,720 | 9/1998 | Buzbee ........................................ | 717/9 |
| 5,828,883 | 10/1998 | Hall ............................................. | 717/4 |
| 5,835,771 | 11/1998 | Veldhuizen ................................. | 717/5 |
| 5,850,552 | 12/1998 | Odani et al. ................................. | 717/9 |
| 5,850,553 | 12/1998 | Schlansker et al. ......................... | 717/9 |
| 5,909,578 | 6/1999 | Buzbee ........................................ | 717/4 |
| 5,915,114 | 6/1998 | McKee et al. ............................... | 717/4 |
| 5,920,723 | 7/1999 | Peyton, Jr. et al. ......................... | 717/7 |
| 5,950,009 | 9/1999 | Bortnikov et al. .......................... | 717/9 |
| 5,960,198 | 9/1999 | Roediger et al. ............................ | 717/4 |
| 6,006,033 | 12/1999 | Heisch ........................................ | 717/9 |

OTHER PUBLICATIONS

Lee et al.; "Execution Characteristics of Desktop Applications on Windows NT". IEEE/IEE Electronic Library[online], Proceedings of the 25th annual ISCA, pp. 27–38, Jun. 1998.

Zhang et al.; "System Support for Automatic Profiling and Optimization". ACM Digital Library[online], Proceedings of the 16th annual ACM SOSP, pp. 15–26, Oct. 1997.

Cmelik et al.; "Shade: A Fast Instruction–Set Simulator for Execution Profiling". University of Washington and Sun Microsystems, Inc., Technical Report, pp. 1–41, Jun. 1993.

Ebcioglu et al.; "DAISY: Dynamic Compilation for 100% Architectural Compatibility". IBM Research Division, T.J. Watson Research Center, pp. 1–82, Aug. 1996.

Cohn et al.; "Hot Cold Optimization of Large Windows/NT Applications". IEEE/IEE Electronic Library[online], Proceedings of the 29th annual IEEE/ACM ISM, pp. 80–89, Dec. 1996.

Goodwin, D.W.; "Interprocedural Dataflow Analysis in an Executable Optimizer". ACM Digital Library[online], Proceedings of the 1997 ACM SIGPLAN conference on PLDI, pp. 122–133, Jun. 1997.

(List continued on next page.)

*Primary Examiner*—Tariq R. Hafiz
*Assistant Examiner*—Kelvin E. Booker

[57] ABSTRACT

A profile feedback optimization system is provided. The system accepts as input an original application and produces an optimized version of the application. The system first instruments the original application through an instrumentation process such that when it executes, it generates profile data. During instrumentation, the system configures images in the application to trap any function calls to critical functions. This allows the instrumented version of the application to execute transparently and appear as the original version. The instrumentation process converts each original image of the application to a version that references other instrumented images. The instrumentation process also configures the operating system to execute the instrumented version instead of the original version when the user selects the application for execution. Once instrumented, the instrumented application is executed. During execution, profile data produced from the instrumented images is saved in a database. Once profile data has been generated, an optimization process is used to optimize the original version of the application based upon the profile data. The optimized version is also configured to execute just as the original application, but references optimized images instead of original images.

23 Claims, 6 Drawing Sheets

OTHER PUBLICATIONS

IBM Corporation; "Profile Based Optimization for Embedded Controller Environments". IBM Technical Disclosure Bulletin, vol. 39, No. 9, pp. 69–70, Sep. 1996.

IBM Corporation; "Object Code Optimization of Shared Objects on AIX". IBM Technical Disclosure Bulletin, vol. 39, No. 9, pp. 45–46, Sep. 1996.

Chernoff et al.; "FX!32: A Profile–Directed Binary Translator". IEEE/IEE Electronic Library[online], IEEE Micro, vol. 18, Iss 2, pp. 56–64, Mar. 1998.

IBM Corporation; "Automatic Program Reordering of Data References in Unified Cache". IBM Technical Disclosure Bulletin, vol. 39, No. 4, pp. 117–118, Apr. 1996.

IBM Corporation; "AIX Version 4.3 Commands Reference, vol. 2: fdpr Commond". Accessed online Apr. 18, 2000. Retreived from the Internet: http://www.mor.itesm.mx/AIX/en_US/a_doc_lib/cmds/aixcmds2/fdpr.htm, Oct. 1997.

IBM Corporation;"AIX Version 3.2 and 4 Performance Tuning Guide". Accessed online Apr. 18, 2000. Retreived from the Internet: http://www.mor.itesm.mx/AIX/en_US/a_doc_lib/aixbman/prfunged/execfdpr.htm, Apr. 1996.

Schmidt et al.; "Profile–directed restructuring of operating system code". IBM Systems Journal, San Francisco Frameworks, vol. 37, No. 2, Dec. 1997.

Romer et al.; "Instrumentation and Optimization of Win32/Intel Executables Using Etch". Proceedings of the USENIX Windows NT Workshop, pp. 1–7, Aug. 1997.

"USENIX Technical Program, " *The USENIX NT Workshop 1997*, pp. 1–6, http://www.usenix.org/publications/library/proceedings/usenix–nt97/technical.html, downloaded Dec. 16, 1998.-

USER TRANSPARENT MECHANISM FOR PROFILE FEEDBACK OPTIMIZATION

FIELD OF THE INVENTION

This invention relates to the optimization of software programs, and more specifically, to a profile-feedback optimization system for a software application development environment.

BACKGROUND OF THE INVENTION

The process of generating a machine readable version of a software application program involves several steps. After an initial design phase, source code is written in a selected programming language which embodies the logic and processing of the application program. Typically, for anything other than the simplest application programs, the source code is organized into separate routines. Each routine embodies one or more related functions in the application. The routines are stored in various source code files. For example, there is usually a main source code file which corresponds to the main processing logic of the application. The main source code file can incorporate other routines by cross-referencing or "importing" them from one or more ancillary source code files. The ancillary source code files can also import routines by cross-referencing each other or by referencing system libraries which contain commonly used routines.

After the coding process is complete, a compiler translates (i.e., compiles) the source code files into executable images. To compile a source code file, the compiler converts the human readable source code into machine readable instructions or so-called object code. The object code can than be directly executed on a central processing unit (e.g., a microprocessor) in a computer system. Machine language instructions in the object code are organized in a precise manner to carry out the logical processing steps of the application, as expressed by the original source code.

Typically, an application is composed of a main executable image (i.e., the main program) and a group of ancillary executable images that can be invoked, if needed, during execution of the main image. In the Windows NT operating system produced by Microsoft Corporation of Redmond, Wash., the ancillary images are called "dynamically linked libraries" (DLLs). After a program has been compiled into one or more images, the main image is executed, during which time the routines in the ancillary images are executed as needed for their respective functions.

It is in general though to be desirable for the compiler to place as few constraints as possible on the programmer, so that the programmer can be as creative as needed in designing the application. Most compilers therefore use a general set of rules for translating source code to object code which allows them to compile any program in that language. Unfortunately, the general rules do not produce the best performing object code. The resulting programs are therefore said to be "sub-optimal", in the sense that they are not necessarily the most efficient with respect to execution speed, system resource utilization, or other performance criteria.

Another reason that most compilers produce sub-optimal code is that the compiler itself incorporates very little knowledge of how the images perform when executed. In some instances, images may, for example, use more memory than needed, or may perform certain instructions unnecessarily or too repetitively. To produce better object code, some compilers use profile feedback information that includes how the images perform when executed. This information allows the compiler to perform profile feedback optimization.

Profile feedback optimization is also used by various tools to assist the programmer in optimizing the object code. One such tool is "Etch", a system developed by researchers at the University of Washington. In Etch, an instrumentation program analyzes the object code of every executable image, and inserts additional instrumentation object code into it. Typically, the instrumentation code is used to gather data about how the image executes during runtime, what branches are taken and how often, and so forth. For example, during instrumentation of an image, instrumentation code may be inserted into a specific branch point in the image object code to determine how many times that portion of the program executes. There are many other possible purposes for the instrumentation code as well. The reader should consult a paper entitled "Instrumentation and Optimization of Win32/Intel Executables using Etch", published in 1997 [on the Wold Wide Web at http://www.cs.washington.edu/homes/bershad/etch] by the University of Washington, for further details of Etch.

After the instrumentation process is complete, the instrumented version of the application is then executed on the computer. Execution of instrumented images must take place within a special shell program, which serves two purposes. First, the shell program restricts the operation of certain function calls that can be made by the instrumented image. For example, a function call might attempt to pass control to a non-instrumented program. By restricting the use of these types of function calls, the shell program ensures that only instrumented images are executed to avoid complicating the optimization process. The second use of the shell program is to gather so-called profile data produced as a result of the additional instrumentation code. The profile data indicates which functions in which images were executed and other performance information.

After a single execution of an instrumented application, a profile data file will exist for each instrumented image that executed a function containing instrumentation code. That is, each time an instrumented application is "run" in the shell program, any instrumented functions that are "exercised" will output profile data to a new profile data file. Each of these profile data files must then be saved by the user for use during optimization.

The instrumented version of an application is typically executed numerous times in order to "exercise" all of its functions. After numerous executions of an instrumented application, there will be many profile data files that have been saved. By executing an instrumented application in many different ways (i.e., exercising various features in various combinations), the profile data files will contain information that provides an indication of performance bottlenecks in the application.

Once profile data has been gathered, another program called an optimizer analyzes the profile data and converts the original images into an optimized version of the application based on the analysis. To perform the optimization process, a user typically specifies which original images are to be optimized in conjunction with the various profile data files. The optimizer analyzes the selected profile data files and modifies the selected original executable images based on this profile analysis. The original image object code, for example, might be re-written for better memory efficiency. In this manner, the original application is optimized based upon the profile feedback obtained from running the instrumented version of the application.

SUMMARY OF THE INVENTION

1. Brief Description of the Problems with the Prior Art

Prior art profile feedback optimization systems are relatively cumbersome to use as they suffer problems related to collecting, managing and applying profile data in order to optimize an application.

For example, a user directing the profile feedback optimization process must first select an application to be optimized. Then the user must instrument each component image of the application, and assemble the instrumented images into an instrumented application. Since applications are often formed from many and possibly hundreds of images, it is possible for the user to accidently neglect to instrument an image.

After the instrumentation process is complete, the user then must execute the instrumented application in the shell program. After each execution, the user must collect and save the profile data files generated by each instrumented image or they will be overwritten during a subsequent execution. If the user neglects to instrument one of the images in the instrumentation process, no profile data will be produced for that image when executed in the shell program. Performance analysis of this image will then be impossible.

Once profile data has been collected from executing each instrumented image, the user must assemble and merge all of the collected profile data files for an application, and then use these proper profile data files to optimize each original image of the application. Assembling all of the profile data files and original images for the optimization process is also cumbersome. If the user neglects to specify an image or the correct profile data files, that image will remain un-optimized, or it may be optimized based only on limited profile data information. Finally, after optimization, the user must assemble the optimized images to form a new optimized application.

Another problem with prior art systems is that the optimizer program converts the original executable images into the optimized executable images during the optimization process. Hence, if a user makes an error during optimization, the original source code must be re-compiled from scratch to re-create an un-optimized version. One solution might be to copy the original application to a storage area, but this becomes difficult with large applications that are stored in many sub-directories and is an inefficient use of storage space besides.

2. Brief Description of the Invention

The present invention is a transparent profile-feedback environment for assisting a user with developing an optimized version of a compiled application program. To produce the optimized application, the environment provides the user with high level instrumentation, execution, and optimization commands.

First, with a single instrumentation command from the user, the system instruments all of the original executable images of a compiled application program to produce a complete set of instrumented images. When the application is fully instrumented in this manner, each instrumented image contains references only to other instrumented images. To ensure that references are made only between instrumented images, the instrumentation process determines each original executable image that is referenced by an image currently being instrumented. References to each original executable image are then converted to references to a corresponding instrumented version of that original executable image. The automated instrumentation process also ensures that an instrumented application, when executed, will not refer back to an un-instrumented (i.e., an original) executable image. Moreover, since the technique for determining which images are part of the original application is automatic, the user cannot neglect to instrument an image.

Also during the instrumentation process, each instrumented image is prepared to execute transparently. That is, the images are prepared to execute without the need for a shell program. This is done by providing a critical function file containing a list of critical functions corresponding to system library functions that, when executed, allow an instrumented image to execute as if it were the original image. In the instrumentation process, all references to critical system library functions are converted to references to corresponding critical functions in the critical function file. The critical functions are also rewritten to "trap" these system library calls to ensure that an instrumented image does not transfer processing to a non-instrumented image.

Also, the critical functions return modified requested system information that allows the instrumented image to appear as though it is an original image, thus providing execution transparency from the user's perspective. That is, when the instrumented images are executed, certain system information (such as program director locations) is returned from the re-written critical functions as though the instrumented image is located and is executing as its corresponding original image.

Another aspect of the invention is that the operating system transparently executes the instrumented images upon command from the user, instead of the original executable images, to generate the profile data. That is, after instrumentation, when the user enters a command to execute the application, the instrumented version will execute instead of the original, in a manner which is transparent to the user. When the instrumented images execute, they appear to the user to execute just as the original executable images. For example, calls made to critical functions are trapped via the critical function list in the critical function file. This makes it appear to the user and to the instrumented image that the original executable images are executing.

The user only needs to be concerned with running the application as though he or she were executing the main image of the original un-instrumented application. The execution process is carried out with one simple user command that runs the instrumented application on the operating system just as a normal program. This avoids the need for the user to start a shell program and to consider which images need to be executed in the shell program. Also during execution, profile data files are automatically stored in a profile optimizer database. This avoids having to copy and save the profile data files after each execution.

A final command optimizes the original executable images in conjunction with the profile data generated by executing the instrumented images. The optimization process generates these optimized images without overwriting the originals. In keeping with the transparency notion of the system, each optimized image contains references only to other optimized images. In this manner, when the optimized images are executed, they appear as though they are the original executable images, although they have been optimized for better performance.

Another aspect of the invention concerns profile optimizer database which stores the instrumented an optimized versions of the executable images and profile information. The profile optimizer database allows multiple versions (i.e., original, instrumented, optimized) of the application and profile data files to exist without the need to overwrite their prior versions.

An image modifier is used to create the instrumented and optimized versions of the executable images in the profile optimizer database. The image modifier executes in conjunction with a profile feedback optimizations process and determines which images are related to the un-optimized application selected for instrumentation and/or optimization by the user. An optimizer process accepts profile information collected for each instrumented image that is executed by the user and invokes the image modifier to optimize the un-optimized application in conjunction with the profile information. The optimizer then outputs the optimized versions for the application.

To allow instrumented and optimized applications to execute and appear to the user and to the applications themselves as if they were the original code, a transparent application substitution (TAS) process is also provided. The TAS process modifies the images as noted above to create an environment for transparently executing the instrumented and optimized versions of the application whenever the user selects the original version of an application for execution.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
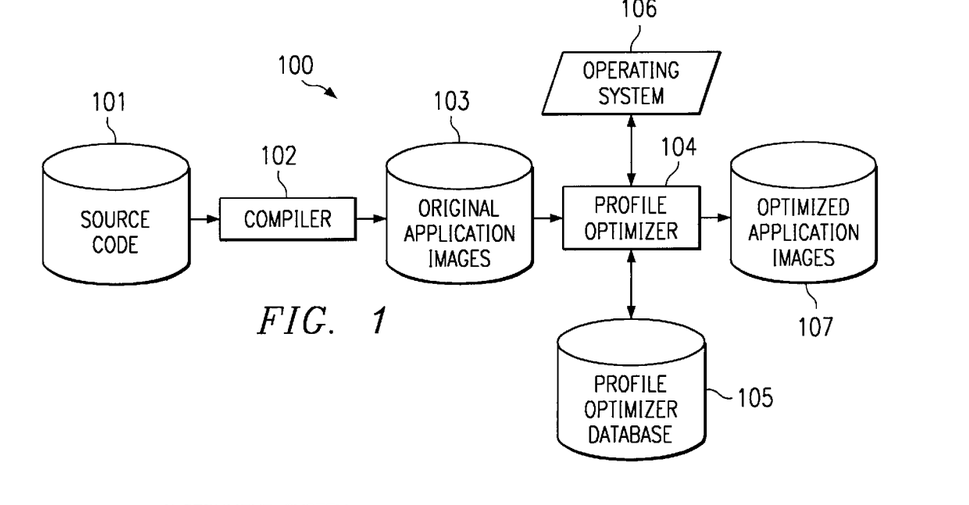
FIG. 1 is a block diagram illustrating a profile feedback optimization system according to this invention.

FIG. 1 illustrates a software development environment including a profile feedback optimization system 100 configured according to the present invention. The optimization system 100 includes source code 101, a compiler 102, original application images 103, a profile optimizer 104, a profile optimizer database 105, an operating system 106, and an optimized application images 107. In operation, the compiler 102 translates the source code 101 to produce the original application images 103 (i.e., object code). The profile optimizer 104 receives the original application images 103 as input and performs the profile feedback optimization process of the invention. The profile optimizer 104 also interacts with the operating system 106 and profile optimizer database 105.

For example, the source code 101 may be one or more computer programs written in a programming language such as C, C++, or another compilable language compatible with compiler 102. The source code 101 and the original application images 103 are stored, for example, on a computer readable medium such as a hard disk within a computer system. Operating system 106 preferably executes on a computer based on an Alpha AXP microprocessor manufactured by Compaq Corporation of Houston, Tex., or another compatible microprocessor. In a preferred embodiment, the operating system 106 is the Windows NT™ operating system (Windows NT is a registered trademark of Microsoft Corporation of Redmond, Wash.).

As will be explained more completely below, a user directing the profile feedback optimizer 104 does not need to know or maintain the complex details of file management and configuration, such as complex lists of input and output files for instrumentation or optimization processes. This aspect of the system 100 referred to as user transparency results in a profile feedback optimizer 104 that is faster, less complicated and less error prone than conventional systems.

The profile feedback optimization process applies an optimization process to a software application that has already been compiled, for example, by compiler 102. The compiler 102 is not required for the processing of this invention, other than to initially produce the original application images 103 (i.e., the original executable images). Once an original executable version of a software application exists, regardless of where it came from, the application may be optimized.

Figure 2:
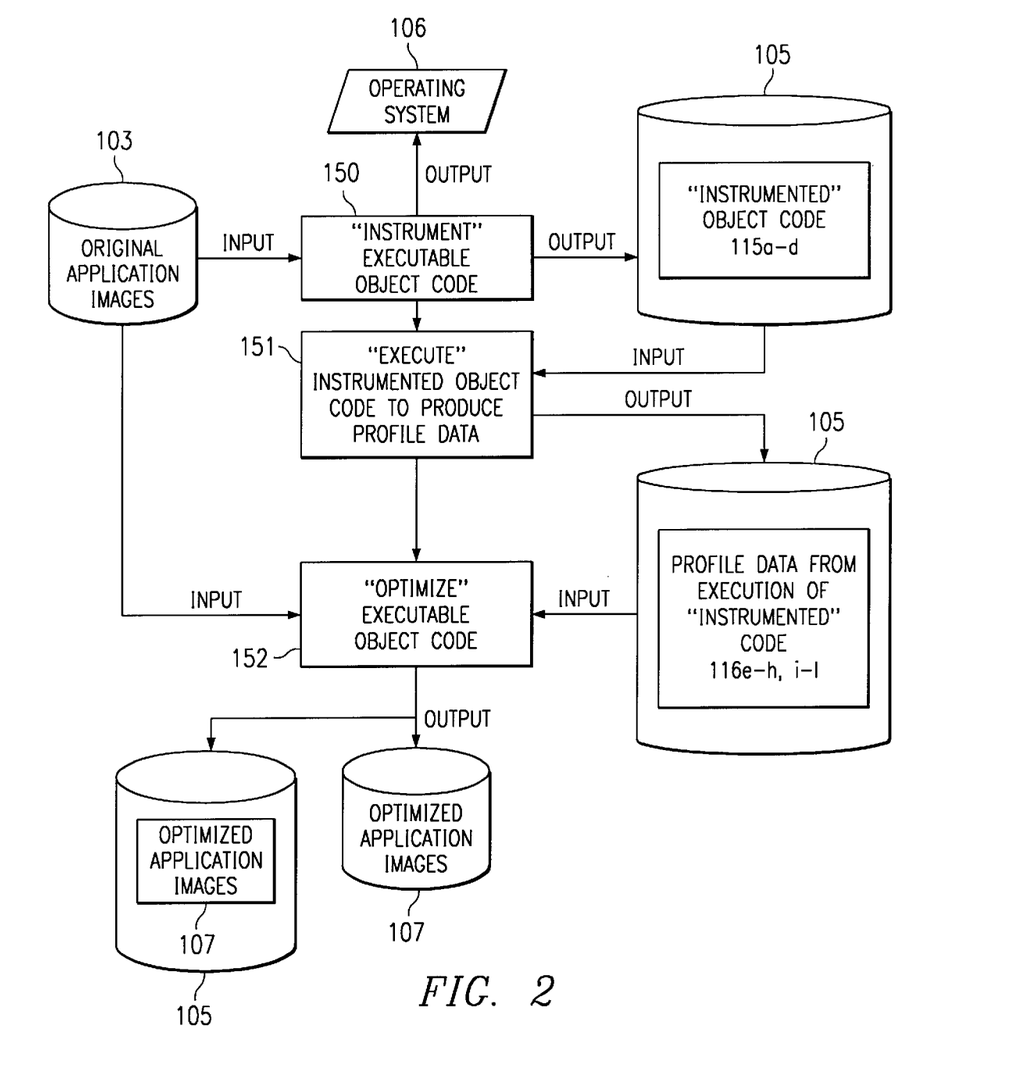
FIG. 2 is a flow chart of the steps performed by the profile feedback optimization system of the invention.

FIG. 2 illustrates an overview of the main processing steps 150, 151 and 152 of the profile feedback optimization process performed by the profile optimizer 104. Upon command from a user, step 150 first "instruments" the executable object code of each original application image 103 a–d. When the instrumentation process is complete (as will be explained in detail later), step 150 outputs "instrumented" executable object code 115 a–d into profile optimizer database 105. The instrumented object code 115 a–d contains additional instrumentation object code inserted at locations throughout the application via the step 150 and contains modifications to file references to other executable images. Instrumentation step 150 also makes modifications to the operating system 106 in order to allow the instrumented object code 115 a–d to execute (step 151) transparently to the user.

In step 151, upon direction from the user, the instrumented object code 115 a–d is read from the profile optimizer database 105 and is executed a number of times. The purpose of each execution is to "exercise" various aspects and functions of the application. During each execution, profile data 116 e–h, 116 I–l, and so forth is output and stored in profile optimizer database 105. The profile data 116e–h, 116I–l is generated as a result of the instrumentation process performed in step 150. Each time the application executes and produces profile data, it does so transparently from the perspective of the user. No shell program is needed. That is, the user merely instruments the application in step 150, and then executes the application in step 151 as if the user were executing the original application images 103 in the operating system 106. The application executes as normal and user interaction (i.e., input/output) with the application proceeds as normal. The user need not be concerned with profile data capture or understand various file management and configuration issues that take place "behind the scenes."

After step 151 "exercises" the instrumented application via multiple executions, step 152 optimizes the original application images 103 by using the profile data files 116 e–h, I–l, etc. stored in profile optimizer database 105. During the optimization process in step 152, optimized executable object code 107 m–p is output into the profile optimizer database 105. Alternatively, the optimized application images 107 may be stored as a regular executable application on a computer readable medium such as a hard disk. During the optimization process of step 152, transparency exists in the sense that the user need not understand how each profile data file is used in the optimization process. The user simply instructs the system of this invention to "optimize" the named application.

To perform profile feedback optimization on an application in this manner, each of the processing steps 150, 151 and 152 can be respectively invoked by the user with the simple commands "instrument", "execute" and "optimize", respectively, along with an appropriate application name. Alternatively, after instrumentation (step 150), the user can perform the execution step 151 simply by executing the instrumented application as a normal application, for instance, at a DOS prompt. In all cases, the user does not need to specify or even know the names of all of the images associated with an application to be optimized. Nor does the user need to be concerned with any file management and/or configuration during the entire optimization process. The system using profile optimizer database 105 handles these tasks and stores all associated files.

Moreover, during execution of an instrumented application in step 151, the user does not need to know the difference between instrumented and non-instrumented versions of an application. The user only needs to understand that once an application has been instrumented (step 150), executions after that point in time produce profile data. Then, when the user is satisfied that he or she has exercised all important aspects of the application via multiple executions, the user can optimize the application. Thereafter, all executions of the application will execute the optimized version. Furthermore, if the user desires to return to the original version for some reason, the invention keeps the original images intact. That is, the original versions of the application are not overwritten by optimized versions.

During execution of an instrumented application, access to the proper instrumented object code files 115 is managed. By managing all necessary files in the profile optimizer database 105, the user is not required to specially edit or direct processing input or output to the appropriate instrumented file locations or directories, as in prior art systems. The processing steps 150 through 153 handle all of the processing necessary to accomplish a simple and seamless profile feedback optimization process for the optimization.

Figure 3:
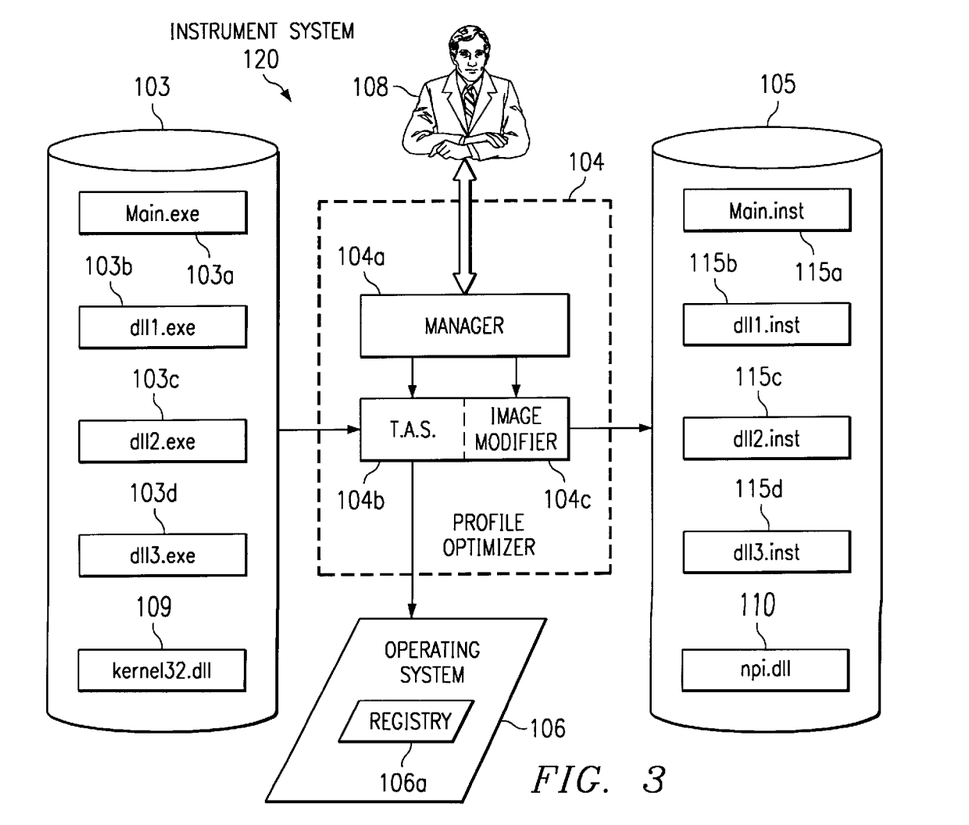
FIG. 3 is a block diagram illustrating the instrumentation process according to the invention.

FIG. 3 is a more detailed block diagram of an instrumentation system 120 that performs the instrumentation step 150. The instrumentation system 120 includes profile optimizer 104 which includes a manager process 104-a, a transparent application substitution (TAS) process 104-b, and an image modifier 104-c.

The manager process 104-a serves as a user interface and accepts commands from the user 108 to perform the processing of steps 150 through 152 of FIG. 2. The TAS process 104-b and the image modifier 104-c are tightly integrated to interact with the manager 104-a to perform the instrumentation process step 150. The TAS process 104-b and image modifier 104-c accept the original un-instrumented and original application images 103 (images 103-a through 103-d) as input and produce an instrumented version of these images (images 115-a through 115-d) as output to profile optimizer database 105. The TAS process 104-b also interacts with a registry 106-a which is part of the operating system 106.

To further explain the instrumentation step 150, a brief description of the structure of an executable program will be presented. The original application images 103 are illustrated as a number of separate images 103-a through 103-d each containing object code. The original application images 103 include a main executable image "main.exe" 103-a, as well as a number of other images which are dynamically linked libraries (DLLs) "dll1.exe" 103-b, "dll2.exe" 103-c, and "dll3.exe" 103-d. Each image 103-a through 103-d is stored as a file in the file system of the computer and contains executable object code including instructions, data and data structure definitions. When main.exe 103-a is executed, it can invoke functions contained as object code within one or more of the other DLL images 103-b through 103-d which are part of the entire set of original application images 103.

Each executable image 103-a through 103-d includes an "import" section and an "export" section as part of its internal data structure definitions. The import section of an image identifies functions in other images that are required during execution of this particular image. The export section of an image defines all of the function within this image that are available for use by any other images. These other images of course must include this image in their import section in order to use exported functions. Thus, the import and export sections of an image indicate which other images and functions are required for an image to execute, and indicate which functions are provided by an image for other images to use. The present invention uses and modifies the information in the import and export sections of object code files during the instrumentation process.

Table 1 below illustrates an example of the relationship between the import and export sections for each of the images 103-a through 103-d that comprise the original and un-instrumented application program 103.

TABLE 1

Imports/Exports for Un-instrumented Executable Images

| FILE | IMPORTS | EXPORTS |
| --- | --- | --- |
| main.exe | dll1.exe FunctionA | main |
|  | dll2.exe FunctionD |  |
| dll1.exe | dll2.exe FunctionC, | FunctionA |
|  | FunctionD | FunctionB |
|  |  | Forward: FunctionX:dll3.exe |
| dll2.exe | dll3.exe FunctionX | FunctionC |
|  |  | FunctionD |
| dll3.exe | kernel32.dll | FunctionE |
|  | SearchPath | FunctionX |
|  |  | Forward FunctionY:Kernel32.dll |
| kernel32.exe | — | FunctionY |
|  |  | SearchPath |
|  |  | CreateProcess |
|  |  | GetCommandLine |
|  |  | GetModuleFileName |
|  |  | LoadLibrary |
|  |  | LoadLibraryEx |
|  |  | GetModuleHandle |
|  |  | GetProcessAddress |
|  |  | . . . |
|  |  | . . . |
|  |  | . . . |

Whereas the export section of an image lists functions provided by that image, the import section lists filenames of other images and all functions imported from those images. In Table 1, main.exe imports example FunctionA from dll1.exe and FunctionD from dll2.exe, and exports only one function, main, which is called by the operating system when the application 103 is first started. Dll1.exe lists dll2.exe in its import section since, during execution, dll1.exe requires FunctionC and FunctionD which are provided by (i.e., exported from) dll2.exe. Dll1.exe exports functions FunctionA, FunctionB and FunctionX for use by any other image that imports dll1.exe.

Note that FunctionX is preceded by a "forward" statement "Forward:dll3.exe." This forward statement indicates that the actual executable object code for FunctionX is not contained within the object code for dll1.exe. Rather, the code for FunctionX is actually contained in the image file designated after the colon ":", which in this case is dll3.exe. FunctionX is said to be "forwarded" in dll1.exe, or, stated another way, dll1.exe forwards calls to FunctionX to dll3.exe.

In a similar manner, dll2.exe imports dll3.exe in order to access FunctionX which is exported from dll3.exe. Dll2.exe exports FunctionC and FunctionD for use by any images that import dll2.exe, which in this example are the images main.exe and dll1.exe. Dll3.exe imports only one image, Kernel32.dll, which is a system library that is provided in operating system 106. That is, kernel32.dll is not generated by the compiler 102 when source code 101 is compiled. Kernel32dll is a standard function library that provides object code for functions that are commonly used by application programs, such as application 103. Dll3.exe exports FunctionE, FunctionX, and forwards FunctionY to Kernel32.dll. Finally, Kernel32 does not import any object code files, and exports FunctionY, and other functions.

Aside from the example FunctionY, the functions that are listed in the export section for Kernel32.dll in Table 1 are of specific interest to this invention during the instrumentation, execution and optimization processes. Those functions are SearchPath, CreateProcess, GetCommandLine, GetModuleFileName, LoadLibrary, LoadLibraryEx, GetModuleHandle, GetProcessAddress. These function are called "critical" functions. Critical functions are of interest since calls to these functions provide information or services that must be modified to allow the instrumented images to execute transparently, as if they were the original images. This is an important aspect of the system, as will be explained in further detail below.

The instrumentation process step 150 is based in part on the observation that if the import and export sections of images in an application program are analyzed, beginning with import section of the main executable image (e.g., main.exe), all executable image files that are referenced during execution of that application can be determined. Accordingly, as each image of an application is instrumented with profile code, the import, export and forward references to other image files or functions are modified to ensure that they reference only other instrumented images, instead of their non-instrumented counterparts. Stated in another way, during instrumentation, file name references are changed in the import and export sections to reflect only other instrumented image file names. Accordingly, when a user executes the instrumented main image 115-a in step 151 (to generate profile data), this main image 115-a will only refer to functions in other instrumented images 115-b–d. Instrumented images 115-b–d in turn will have their import and export sections modified to reflect only other respective instrumented images. When the instrumentation process is complete, reference to non-instrumented images that have an instrumented counterpart (i.e., an instrumented version) will not exist in any images related to an application. As will be explained, altering references in the import and export sections avoids the need for the user to have to copy, rename, or move the original non-instrumented original application images 103 a–d in fear of an instrumented image 115 references a non-instrumented image 103.

Figure 4:
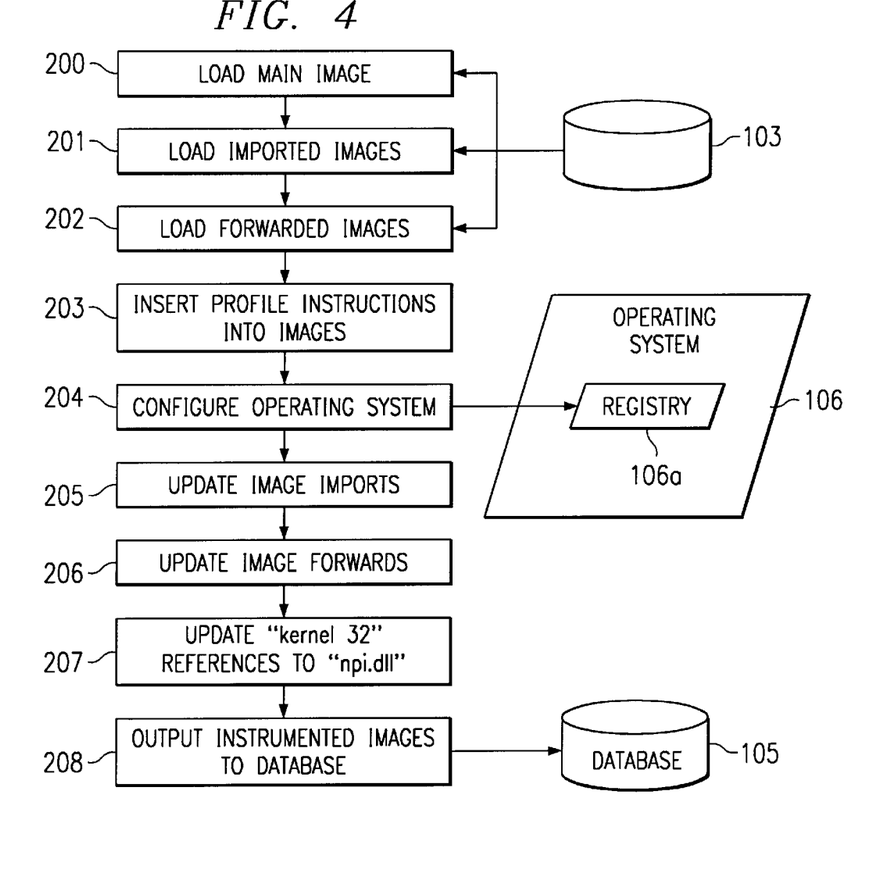
FIG. 4 is a flow chart of steps performed during the instrumentation of an application according to the invention.

FIG. 4 is a flow chart showing instrumentation steps 200 through 208 according to the present invention. Steps 200 through 208 are represented by step 150 in FIG. 2 and are performed by the TAS process 104-b in conjunction with the image modifier 104-c. Steps 200 through 208 convert non-instrumented, original application images 103-a through 103-d into corresponding instrumented images 115-a through 115-d.

To instrument an entire application, step 200 first loads the original, un-instrumented main image 103-a of the application into memory. Step 201 then analyzes the import section of the main image 103-a and loads any imported images that are referenced. Step 201 then repetitively loads each newly-referenced image that has not already been loaded and performs a similar analysis of its import section. This process repeats until every image referenced by an application has been analyzed. That is, step 201 recursively determines every image that is imported by the images that comprise an application. In the example in Table 1, step 201 loads dll1.exe 103-b and dll2.exe 103-c since they are imported in main.exe 103-a. Then step 201 loads dll3.exe 103-d since this image is listed in the import section of dll2.exe 103-c and has not already been loaded. Finally, step 201 loads kernel32.dll 109, since the import section in dll3.exe 103-d references kernel32.dll 109 which has not already been loaded.

Step 202 then loads into memory any images that are referenced via forward entries in the images that were loaded in step 201. Images referenced via forward entries are only loaded in step 201 if they do not already exist in memory (i.e., have not already been loaded). In the example in Table 1, only the images dll3.exe and kernel32.dll are referenced by forward statements in the export sections of dll1.exe and dll3.exe, respectively. Since dll3.exe and kernel32.dll get loaded into memory during step 201, in this example, they are not loaded in step 202.

Next, step 203 inserts profiling instructions into each image loaded in steps 201 and/or 202. The image modifier 104-c strategically inserts additional object code into the pre-existing object code of an image. The content, location and purpose of this additional object code, called instrumentation code, is not particularly relevant. Various known instrumentation and profiling strategies are known to those skilled in the art, and these details are not pertinent here. What is important is that the additional instrumentation code, when executed along with the rest of an instrumented image, will output profile data concerning that image or a function in that image.

Once all of the images for an application have been modified in step 203, the invention configures the operating system 106 to properly execute the newly available instrumented application. From the user's perspective, the instrumented application effectively replaces the original application. The original application, however, is still available for use if needed.

In effect, the system provides a mechanism to "spoof" the user into running the instrumented application with the same command that would be used to run the original non-instrumented version. This is accomplished in step 204 via the registry 106-a. The registry 106-a is a portion of the operating system 106 that identifies what specific image to execute upon receipt of a command from a user. In essence, part of the registry 106-a is a lookup table that matches user commands with programs that are to be executed. Specific to this system, a registry entry is created that instructs the operating system to run the instrumented application whenever the user give the command to run the original application. Step 204 therefore configures the registry 106-a of the operating system 106 with the location of the main image 115-a of the instrumented application.

In the preferred embodiment, which operates on the Windows NT operating system, registry entries comprise keys and optional subkeys. One specific key, called "HKEY_LOCAL_MACHINE\SOFTWARE\Microsoft\Windows\NT\Current Version\Image File Execution Options", uses subkeys to list images that may be executed, along with various options that may be invoked when those images are executed. The registry 106-a is typically used to store operating system and application specific information.

After instrumentation, a registry entry for "main.exe" is created to cause the instrumented version 115 a–d of the application to be executed instead of the original version 103 a–d. Step 204 creates a key in the registry 106-a for "main.exe" and creates a value for this key beginning with the word "debugger", as follows:

---

KEY: Image File Execution Options
    KEY: Main.exe
        debugger=. . . \Database\Instrument\main.inst.

---

The "debugger" value associated with the main.exe key is used to invoke a specified debugger application when the application specified in the key is executed. This registry modification instructs the operating system to execute the program specified after "debugger=", when the application program specified after the word "KEY" is invoked. That is, if the user executes "main" or "main.exe", the modified registry will cause the operating system to execute "main-.inst". Note that the program specified after "debugger=" is ". . . \Database\Instrument\main.inst." In this example, "main.inst" is the instrumented version of the application which is stored in profile optimizer database 105. In the preferred embodiment, the TAS process 104-b creates a the key and the "debugger" value in registry 106-a.

After the registry 106-a is updated, step 205 of the instrumentation process updates the image import sections (Column 2, Table 1) of each instrumented image. Step 205 changes the name of any non-instrumented image, referenced in each import section of each instrumented image, to the name of a corresponding instrumented image file. That is, for all image names in the import sections of images loaded in step 201 and 202, step 205 renames the image names to their instrumented counterparts. For example, with respect to Column 2 in Table 1, step 205 changes the non-instrumented image names dll1.exe, dll2.exe and dll3.exe in the import section in each of the image files to the names of the corresponding instrumented versions of these files dll1.inst, dll2.inst and dll3.inst.

Step 206 then updates forward statements so that they only reference instrumented versions of the images. That is, for any functions that are forwarded to other image files, step 206 ensures that the image file name is an instrumented image instead of a non-instrumented image. As an example, in the export section of dll1.exe in Column 3 in Table 1, image file name dll3.exe appears as "forward:FunctionX:dll3.exe." Accordingly, step 206 modifies the forward reference to appear as "forward:FunctionX:dll3.inst" in the export section of the corresponding instrumented image dll1.inst 115-b.

Recall that Table 1 illustrates imports and exports for a non-instrumented image. Table 2 below, as contrasted with Table 1, illustrates how the import and export sections differ between non-instrumented application images 103-a through 103-d and the instrumented counterparts of those images 115-a through 115-d.

TABLE 2

Imports/Exports for Instrumented Executables

| FILE | IMPORTS | EXPORTS |
| --- | --- | --- |
| main.inst | dll1.inst FunctionA<br>dll2.inst Function D | main |
| dll1.inst | dll2.inst Function C<br>Function D | FunctionA<br>FunctionB<br>Forward: FunctionX:dll3.inst |
| dll2.inst | dll3.inst FunctionX | FunctionC<br>FunctionD |
| dll3.inst | npi.dll SearchPath | FunctionE<br>FunctionX<br>Forward FunctionY:npi.dll |
| npi.dll | Kernel32.dll | SearchPath<br>CreateProcess<br>GetCommandLine<br>GetModuleFileName<br>LoadLibrary<br>LoadLibraryEx<br>GetModuleHandle<br>GetProcessAddress<br>Forward FunctionY:Kernel32.dll<br>Forward . . . :Kernel32.dll<br>Forward . . . :Kernel32.dll<br>. . . |
| Kernel32.dll | — | FunctionY<br>. . . |

Note that each import reference that previously (Table 1) referenced a non-instrumented image now references a corresponding instrumented version of the same image in Table 2. Further, note that each function that was forwarded to a non-instrumented image is, in the instrumented version, forwarded to a corresponding instrumented image containing that instrumented function.

Table 2 also illustrates the processing that takes place in step 207. Step 207 updates any import or export references that were made to the "Kernel32.dll" image 109 to reference an image named "npi.dll" (shown as 110 in FIG. 3).

For example, in the non-instrumented image dll3.exe 103-d, as shown in Table 1, FunctionY is forwarded from the export section to the system supplied image file Kernel32.dll. Step 207 converts the forwarded FunctionY export reference in the corresponding instrumented image dll3.inst 115-d to refer to an image file named "npi.dll."

Npi.dll 110 is the critical function file and is stored in the profile optimizer database 105. The primary purpose of Npi.dll 110 is to trap, during execution of an instrumented image, certain critical function calls that normally would be directed to functions in Kernel32.dll 109.

Generally, step 207 provides a transparent execution environment for the instrumented application for all system level function calls. In other words, by rewriting the critical functions of Kernel32.dll 109 and placing the rewritten versions in nip.dll 110, when an instrumented image invokes a critical function, the npi.dll version is used. The eight functions are called critical functions because these functions provide information and services that return information that must be modified to allow an instrumented version of the application 110 to execute and "appear as" the original application 103. For example, one purpose for trapping these types of function calls during execution of an instrumented application 115 is to ensure that the images or files or locations that they reference during execution are themselves properly instrumented files.

For example, one of the functions provided in Kernel32.dll 109 is "LoadLibrary". During execution of an instrumented image, the LoadLibrary function may be called to load any specified image. The image to be loaded, for example, could be specified by a user at runtime as a parameter. This may be a problem for an instrumented version of the application because control could be transferred to a non-instrumented image. However, in the present system this problem is avoided and no shell program is required during execution. To do so, npi.dll 110 contains a rewritten version of LoadLibrary which intercepts the call made to the regular LoadLibrary function (i.e., the one in Kernel32.dll 109) and replaces the image name specified as the parameter with the name of a corresponding instrumented image. The LoadLibrary function in npi.dll 110 then calls the "real" LoadLibrary function in Kernel32.dll 109 along with the modified parameter. If LoadLibrary attempts to load an image that does not have a corresponding instrumented version, the npi.dll version of LoadLibrary first invokes the Image Modifier 104-c to create an instrumented version of the specified image. After the instrumented version is created, the npi.dll 110 version of LoadLibrary then calls the real LoadLibrary in Kernel32.dll 109 and provides the name of the newly created instrumented version of the image as the parameter.

Including LoadLibrary, there are a total of eight critical functions that are trapped by npi.dll 110. The functions are SearchPath, CreateProcess, GetCommandLine, GetModuleFileName, LoadLibrary, LoadLibraryEx, GetModuleHandle, and GetProcessAddress. A version of each of these functions is provided by the invention in npi.dll 110. A description of each function and a summary of its operation during execution will be given when the details of step 151 (i.e., execution of the instrumented application) are provided. Note in Table 2 that each of the eight critical functions is exported from npi.dll 110, and that all other functions provided by kernel32.dll 109 are forwarded directly to kernel32.dll 109.

After step 207 is complete, step 208 outputs the entire set of instrumented images into profile optimizer database 105.

After step 208 is complete, the instrumentation process (FIG. 4) is finished. At this point, every import and export section of every instrumented image 115-a through 115-d has been modified to refer to other instrumented images. The user can now exercise the instrumented version of the application by executing it a number of times (step 151 in FIG. 2) in order to generate profile data.

Figure 5:
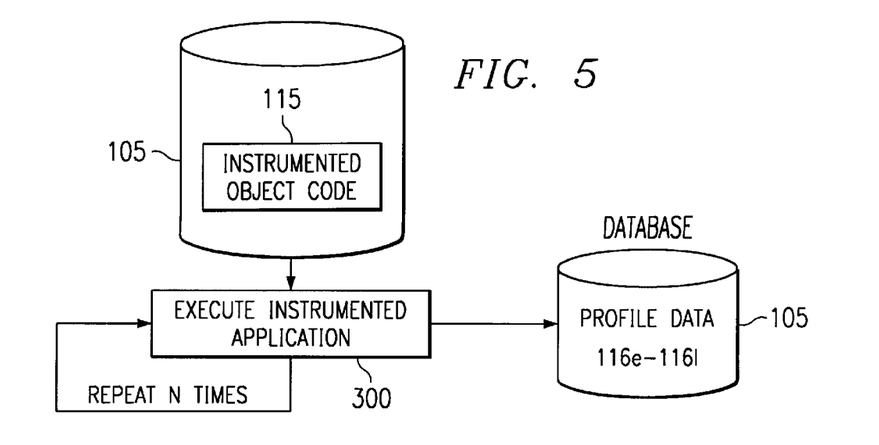
FIG. 5 is a flow chart showing the iterative execution of an instrumented application to generate profile data according to the invention.

Step 300 in FIG. 5 illustrates the typical processing performed by user 108 in order to execute the instrumented application 115-a through 115-d. (step 151 of FIG. 2) Step 300 reads and executes the instrumented application images 115-a through 115-d contained in profile optimizer database 105. During each execution, the instrumented object code images 115-a through 115-d produce profile data files, beginning with 116-e. Step 300 can be executed any number of times by the user 108. The purpose of multiple executions is so that various aspects of the instrumented application can be "exercised." Generally, the idea is to create large amounts of profile data that accurately reflects execution of the application in many different ways. This profile data is then used for optimization.

Figure 6:
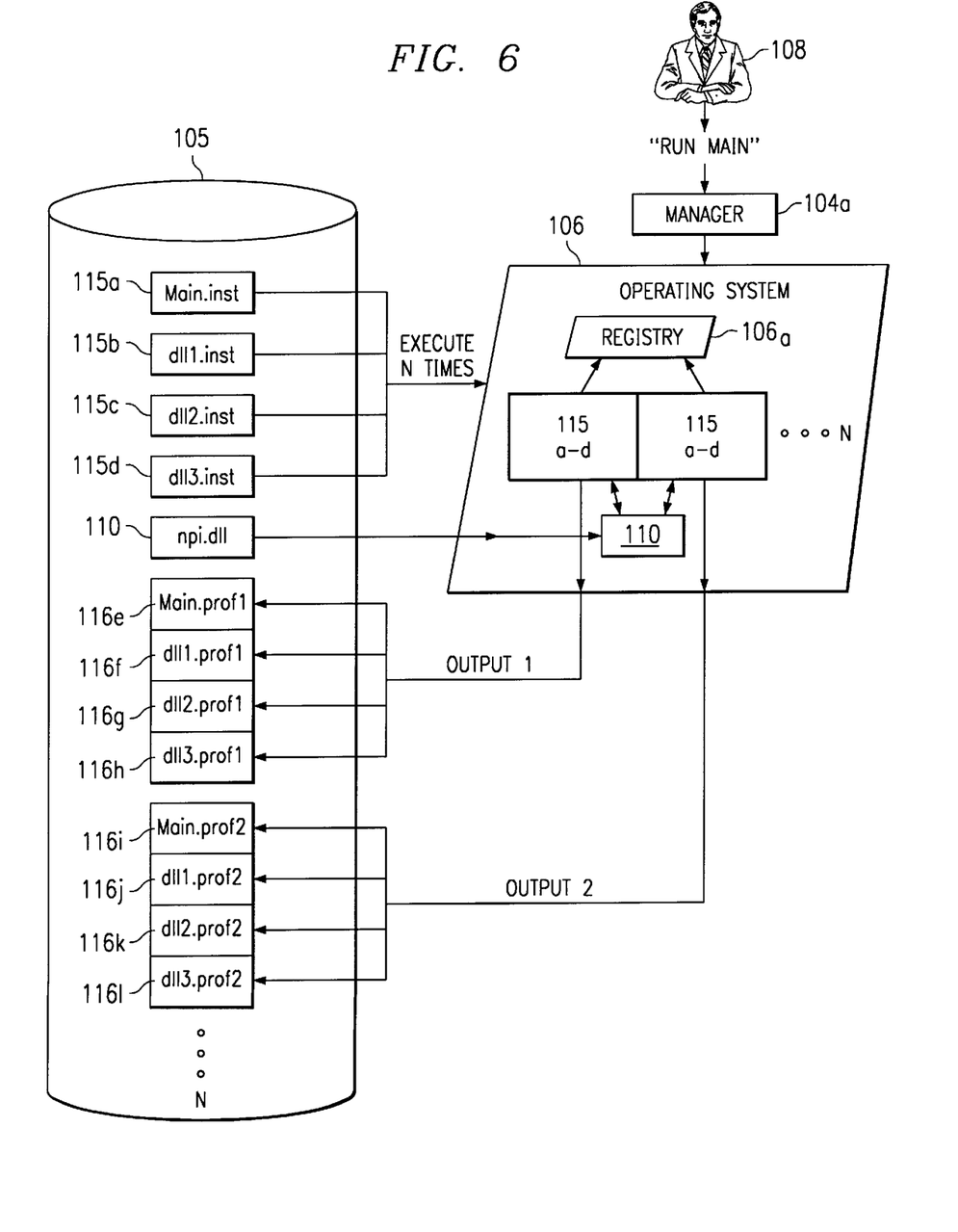

FIG. 6 illustrates a block diagram of the execution process (e.g. step 300 in FIG. 5). In FIG. 6, user 108 "runs" the main image 115-a of the instrumented application via manager 104-a. Alternatively, the user may merely select "main" or "main.exe" for execution via a keyboard, mouse or other means. Irrespective of how the user 108 invokes the application, the operating system 106 consults the registry 106-a for the actual program to execute. Since the registry 106-a has been modified via the instrumentation process (Step 204, FIG. 3), the instrumented version of the application is executed instead of the original version. The user therefore need not be concerned with specifying the instrumented version versus the original version.

The execution of the images 115-a through 115-d is performed via the operating system 106, just as if a regular application were being executed. That is, no special shell program is needed to capture and save the profile data files 116-e through 116-l. Each time the instrumented application is executed, instrumented functions in images 115-a through 115-d produce profile data files (i.e., main.profl 116-e, dll1.profl 116-f, etc.) due to the instrumentation code they contain. Thus, during the first execution, profile data files 116-e through 116-h are created. During the next execution of the instrumented application profile data files 116-I through 116-l are created, and so forth. There is a separate profile data file created for each image during each execution.

During the execution of an instrumented application, instrumented images 115-a through 115-d can make calls to any of the eight critical functions. As noted previously, these functions are SearchPath, CreateProcess, GetCommandLine, GetModuleFileName, LoadLibrary, LoadLibraryEx, GetModuleHandle, and GetProcessAddress. Recall that these critical function calls are trapped by rewritten versions of these functions in npi.dll 110. Each of the critical functions will now be explained along with its relevance to this invention.

The SearchPath function can be invoked by an image to search for a file using a search algorithm. The algorithm first looks for a file in the directory from which the calling application was loaded. The instrumented images (i.e. the instrumented application) are stored in profile optimizer database 105, whereas the original un-instrumented version of the application (i.e., original application images 103) is stored elsewhere. Since the instrumented application is invoked from the profile optimizer database 105, rather than from elsewhere in the filesystem of the computer, npi.dll 110 must intercept calls to SearchPath to determine to correct location of the file being sought. The rewritten version of SearchPath in npi.dll 110 searches for files beginning with the location (i.e. the directory) of the non-instrumented original application, rather than the profile optimizer database directory from which the current instrumented image is executing. By trapping SearchPath calls and first checking the directory of the original application for the file(s) sought, the instrumented version of the application "thinks" it is executing in the original application's home directory.

The CreateProcess function uses the SearchPath function to find an application that is to be invoked. Npi.dll 110 intercepts calls to CreateProcess so that a proper search for the sought after application can be performed, starting in the home directory or file system location of the original non-instrumented original application images 103.

The GetCommandLine function can be used by an image to obtain the command that the operating system 106 used to invoke the application that is currently executing. When the user executes the instrumented version of the application, the user enters, for example, "main.exe" at the DOS prompt, or double-clicks on the application icon if using a Windows interface. As explained above, the registry converts this command into "main.inst" in order to run the instrumented version of the application. However, when GetCommandLine is called, npi.dll 110 traps this call and replaces "main.inst" with "main.exe." This insulates the user and the application from "knowing" that "main.inst" is running instead of "main.exe."

The GetModuleFileName function returns the full pathname of a file containing an image. When an instrumented image calls GetModuleFileName, npi.dll 110 intercepts the call to prevent the function from returning the pathname of a file in the profile optimizer database 105. Instead, the modified version returns the full pathname of the corresponding original image.

LoadLibrary, as discussed in the former example, and LoadLibraryEx are similar to each other in operation. Each of these functions loads a specific image. Npi.dll 110 intercepts these calls during runtime and replaces the original image name with the filename of a corresponding instrumented image, and then calls the actual LoadLibrary or LoadLibraryEx in Kernel32.dll 109 to proceed to load the image specified. If the corresponding instrumented image does not exist, npi.dll 110 first invokes the image modifier 104-c to create an instrumented version of the image using the instrumentation process explained above. That is, during runtime, an application may dynamically be capable of specifying images that should be executed. These images may be in addition to the images listed in import and export sections of images 115-a through 115-d which are part of the instrumented application. Accordingly, if one of the LoadLibrary functions is called to load an image which has not yet been instrumented, the npi.dll 110 version of LoadLibrary can invoke the instrumentation process (i.e., FIGS. 3 and 4) to create an instrumented version (according to the instrumentation process described above) of the image. This can take place during runtime. This newly instrumented version of an image is then used as the image name for an actual call to the "real" LoadLibrary function call in Kernel32.dll 109.

GetModuleHandle is a function which returns a handle to a specified image which is loaded into the address space of the currently executing application. Npi.dll 110 intercepts calls to GetModuleHandle and replaces the original image name with the name of the corresponding instrumented image. Npi.dll 110 then calls the real GetModuleHandle function in Kernel32.dll 109 in order to get the handle of the instrumented image, instead of the non-instrumented version which does not actually exist in the address space.

The last function call intercepted by npi.dll 110 is GetProcAddress. This function returns the address of the specified function in the specified image. Npi.dll 110 intercepts calls to GetProcAddress so that it can detect when the instrumented application is requesting the address of one of the eight critical functions in Kernel32.dll 109 that are being intercepted by npi.dll 110. If the instrumented application object code images 115-a through 115-d requests the address of one of these critical functions in kernel32.dll 109, npi.dll 110 instead returns the address of the rewritten version in npi.dll 110.

In this manner, npi.dll 110 provides wrapper functions for the eight critical functions. The processing described above completes the transparency concept of the invention. That is, when an instrumented application is executing, the user and the application are unaware that an instrumented version of the application, which is stored in a different location, is actually executing. It is noted that these eight functions are trapped in the preferred embodiment but that the present invention is not meant to be limited as such. For instance, other functions that are determined to effect execution of an instrumented application in a similar manner as the eight discussed herein could also be trapped.

Figure 8:
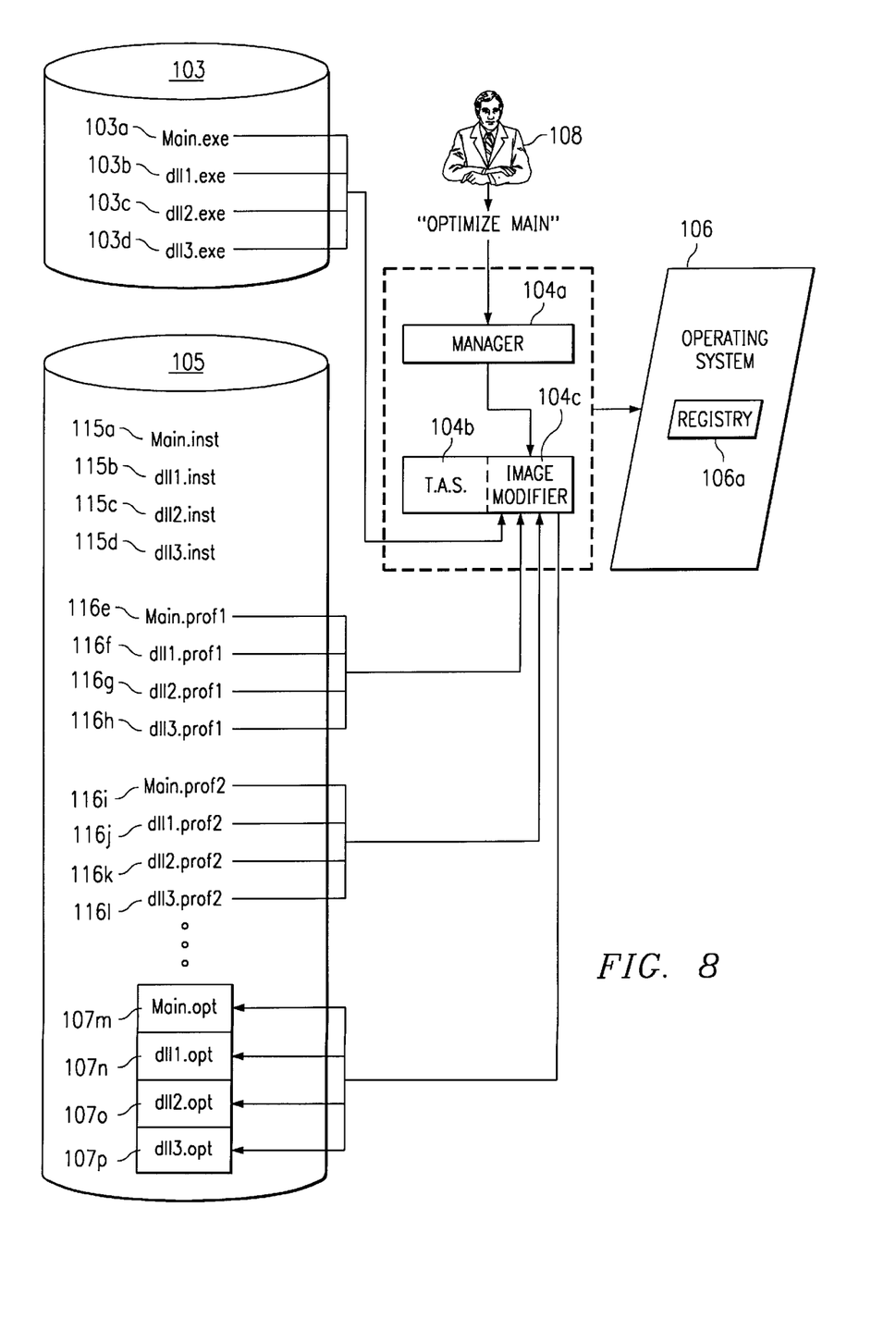
FIG. 8 is a block diagram of the optimization process according to this invention.

The final operation in the profile feedback optimization system of this invention is the optimization process (Step 152 in FIG. 2). The optimization process is carried out by the image modifier 104-c and is illustrated in FIG. 8. Generally, the image modifier 104-c reads as input the original non-optimized application images 103-a through 103-d as well as all of the profile data files (i.e., 116-e through 116-l in FIG. 8). The image modifier 104-c analyzes the profile data and creates an optimized version of the application as images 107-m through 107-p.

Figure 7:
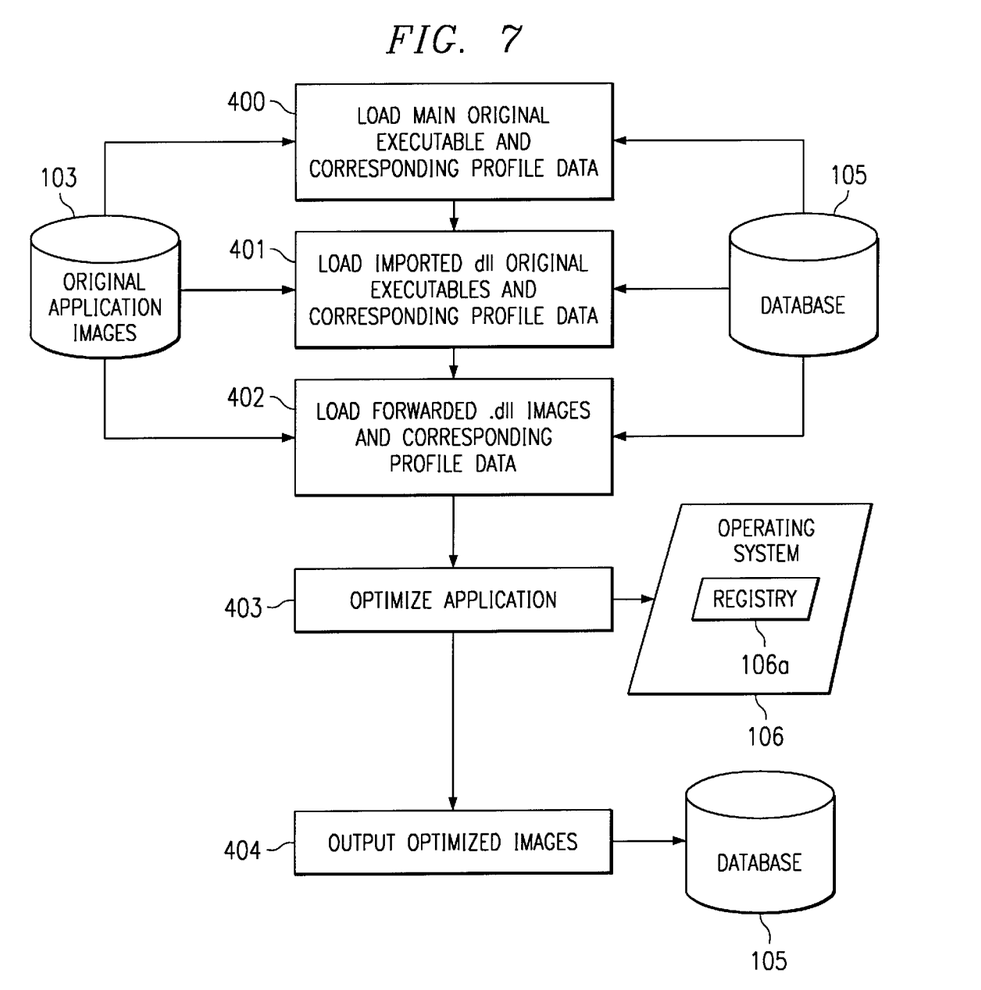
FIG. 7 is a flow chart of the steps involved in the optimization process for the profile feedback optimization system of the invention.

FIG. 7 illustrates steps 400 through 404 which occur during the optimization process. In step 400, the original main image 103-a of the original application is loaded into memory along with its corresponding profile data files main.prof1 116-e, main.prof2 116-i, and so forth. In step 401, all imported DLL images 103-b through 103-d are loaded into memory along with their corresponding profile data files 116-f through 116-h, 116-j through 116-l, and so forth. Next, in step 402, any non-optimized DLL images that contain forwarded functions are loaded into memory along with their corresponding profile data files. Essentially, steps 400 through 401 load into memory the entire set of images for a complete application, along with all of the profile data files produced during the execution process described previously.

Step 403 then optimizes the original images of the application 103 based upon the contents of the profile data files 116-e, 116-f, and so forth. The actual optimization employed is not particularly relevant, as optimization techniques are know to those skilled in the art. However, what is important is that the optimize step 403 modifies the registry 106-a in a similar manner as did step 204 of the instrumentation process of FIG. 4. The difference, however, is that the registry is updated to configure the name of the application from the instrumented version to the optimized version that will be written to the profile optimizer database 105 or to disk in step 404. That is, just as the registry 106-a was updated in the instrumentation process (FIG. 4) to cause the instrumented version of the application to run instead of the original non-instrumented version, step 404 updates the registry to run the new optimized version of the application. To do so, step 404 can change the "debugger" subkey noted above to read:

debugger= . . . \Database\Optimize\main.opt

This causes the optimized version of the main image "main.opt" 107-m to be executed when the user runs the application by specifying "main.exe."

Step 403 also performs processing equivalent in nature to steps 205 through 207 of the instrumentation process in FIG. 4. That is, each image created in the optimized version of the application will reference only other optimized images in its import and export sections and in the forward statements. Furthermore, the eight critical function calls will be trapped by npi.dll 110.

Table 3 below illustrates the final optimized versions of the import and export sections of optimized images 107-m through 107-q.

TABLE 3

Imports/Exports for Optimized Executables

| FILE | IMPORTS | EXPORTS |
| --- | --- | --- |
| main.opt | dll1.opt FunctionA<br>dll2.opt FunctionD | main |
| dll1.opt | dll2.opt Function C,<br>FunctionD | FunctionA<br>FunctionB<br>Forward: FunctionX:dll3.opt |
| dll2.opt | dll3.opt Function X | FunctionC<br>FunctionD |
| dll3.opt | npi.dll SearchPath | FunctionE<br>FunctionX<br>Forward FunctionY:npi.dll |
| npi.dll | Kernel32.dll | SearchPath<br>CreateProcess<br>GetCommandLine<br>GetModuleFileName<br>LoadLibrary<br>LoadLibraryEx<br>GetModuleHandle<br>GetProcessAddress<br>Forward FunctionY:Kernel32.dll<br>Forward . . . :Kernel32.dll<br>Forward . . . :Kernel32.dll<br>. . . |
| Kernel32.dll | — | FunctionY<br>. . . |

Step 404 is the final step of the optimization process which outputs the optimized images 107-*m* through 107-*p* to profile optimizer database 105. When complete, each optimized application image 107-*m* through 107-*p* in profile optimizer database 105 corresponds to a respective original application image 103-*a* through 103-*d*. The registry 106-*a* contains the subkey that will execute the optimized version of the application when a user 108 specifies that he or she wishes to execute the application.

In this manner, the invention provides a system for profile feedback optimization that manages all of the details of file manipulation and configuration management. By keeping all files in the profile optimizer database, the original application remains available for use if needed. Moreover, by performing the above processing, a transparent application substitution environment is provided in which the user performing optimization merely needs to instrument, execute, and optimize the application in three simple steps.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method for providing a transparent profile-feedback optimization environment for developing an optimized version of an original compiled application program, the compiled software application program including a plurality of original executable images, the method comprising the steps of:

instrumenting the original executable images of the compiled application program to produce instrumented images, each instrumented image containing references only to other instrumented images;

transparently executing the instrumented images to generate profile data, such that when the instrumented images execute, they appear to execute just as the original executable image executes;

optimizing the original executable images of the compiled software application, in accordance with the profile data generated by executing the instrumented images, to generate optimized images of the original executable images, each optimized image containing references only to other optimized images.

2. The method of claim 1 wherein the step of instrumenting further includes the steps of:

determining each original executable image that is referenced by an image currently being instrumented; and converting references to each original executable image to references to a corresponding instrumented version of the original executable image, such that the image currently being instrumented references instrumented versions of executable images.

3. The method of claim 2 wherein the step of converting converts import references to original executable images located in the image currently being instrumented.

4. The method of claim 2 wherein the step of converting converts forward references located in the image currently being instrumented.

5. The method of claim 2 wherein the step of converting converts system library references located in the image currently being instrumented to critical function file references.

6. The method of claim 5 wherein the system file references are Kernel32.dll references and the critical function file references are npi.dll references.

7. The method of claim 1 further including the steps of:

storing the instrumented images, the profile data, and the optimized images in a profile optimizer database which is distinct from a storage location of the original executable image, so as to maintain integrity of the original executable images.

8. The method of claim 1 wherein the step of instrumenting further includes the step of:

providing a critical function file containing critical functions and forward entries, the critical functions being those functions from a system library that are intercepted to provide transparency, the forward entries being for all non-critical functions, the forward entries forwarding the non-critical functions to the system library; and converting references to the system library of an image currently being instrumented to critical function file references.

9. The method of claim 8 wherein the critical functions provided in the critical function file are SearchPath, CreateProcess, GetCommandLine, GetModuleFileName, LoadLibrary, LoadLibraryEx, GetModuleHandle, and GetProcessAddress functions, each of which provides transparency to a user and to the image during execution.

10. The method of claim 1 wherein the step of instrumenting further includes the step of modifying an operating system to execute upon command from a user the instrumented images in the profile optimizer database, upon command from a user, instead of the original executable images.

11. The method of claim 1 wherein the step of executing the instrumented images is performed multiple times in order to exercise the instrumented images.

12. The method of claim 1 wherein the step of executing the instrumented images is initiated as if executing the original compiled application program via an operating system, and wherein the instrumented images are invoked by consulting a registry in the operating system that has been modified to invoke the instrumented images instead of the original executable images.

13. The method of claim 1 wherein the step of executing the instrumented images further comprises the steps of:
   providing a critical function file containing critical functions and forward entries, the critical functions being those functions from a system library that are intercepted to provide transparency, the forward entries being for all non-critical functions, the forward entries forwarding the non-critical functions to the system library; and
   trapping calls made to critical functions during execution via the critical functions in the critical function file to make it appear to a user and to the instrumented images that the original executable images are executing.

14. The method of claim 1 wherein the step of optimizing further includes step of:
   modifying each optimized image to refer only to other optimized images in order to provide a transparent execution environment for each optimized image.

15. The method of claim 14 wherein the step of modifying further includes steps of:
   determining each original executable image that is reference by an image currently being optimized; and
   converting references to each original executable image to references to a corresponding optimized version of the original executable image, such that the image currently being optimized only references optimized versions of executable images.

16. The method of claim 15 wherein the step of converting converts import references to original executable images located in the image currently being optimized.

17. The method of claim 15 wherein the step of converting converts forward references located in the image currently being optimized.

18. The method of claim 15 wherein the step of converting converts system library references located in the image currently being optimized to critical function file references.

19. The method of claim 18 wherein the system file references are Kernel32.dll references and the critical function file references are npi.dll references.

20. The method of claim 1 wherein the step of optimizing further includes the step of:
   providing a critical function file containing critical functions and forward entries, the critical functions being those functions from a system library that are intercepted to provide transparency, the forward entries being for all non-critical functions, the forward entries forwarding the non-critical functions to the system library; and
   converting references to the system library of an image currently being optimized to critical function file references.

21. The method of claim 22 wherein the critical functions provided in the critical function file are SearchPath, CreateProcess, GetCommandLine, GetModuleFileName, LoadLibrary, LoadLibraryEx, GetModuleHandle, and GetProcessAddress functions, each of which provides transparency to a user and to the image during execution.

22. The method of claim 1 wherein the step of optimizing further includes the step of modifying an operating system to execute the optimized images, upon command from a user, instead of the original executable images.

23. A computer system configured for profile-feedback optimization of software application programs, the system comprising:
   a profile optimizer database for storing instrumented and optimized versions of executable images and storing profile information collected for each instrumented image that is executed;
   an image modifier for creating the instrumented and optimized versions of the executable images in the profile optimizer database;
   a manager including:
      a user interface process for interacting with a user and allowing the user to select an original application for instrumentation and optimization and allowing the user to control a profile feedback optimization process; and
      a profile feedback optimization process for determining which images are related to the original application selected by the user and invoking the image modifier to create, in the profile optimizer database, the instrumented version of the executable images of the original application; and
      a optimizer process for accepting profile information collected for each instrumented image that is executed by the user and invoking the image modifier to optimize the original application in conjunction with the profile information to produce the optimized versions of executable images for the original application;
   a transparent application substitution process for providing a transparent execution environment which transparently executes the instrumented and optimized versions of an application when the user selects an original version of an application for execution.

* * * * *